US006944971B2

(12) United States Patent
Delgorgue et al.

(10) Patent No.: US 6,944,971 B2
(45) Date of Patent: Sep. 20, 2005

(54) COMPOSITE REINFORCEMENT ELEMENT, A BOOT AND A BINDING INCORPORATING SUCH ELEMENT, AND A METHOD OF MANUFACTURING SAME

(75) Inventors: Gerald Delgorgue, Ruffieux (FR); David Farcot, Annecy (FR)

(73) Assignee: Salomon S.A., Metz-Tessy (FR)

( * ) Notice: Subject to any disclaimer, the term of this patent is extended or adjusted under 35 U.S.C. 154(b) by 11 days.

(21) Appl. No.: 10/299,779

(22) Filed: Nov. 20, 2002

(65) Prior Publication Data

US 2003/0093924 A1 May 22, 2003

(30) Foreign Application Priority Data

Nov. 21, 2001 (FR) .......................... 01 15209

(51) Int. Cl.[7] .................................................. A43B 1/10
(52) U.S. Cl. .................................................. 36/4; 36/45
(58) Field of Search .......................... 36/4, 7.3, 45

(56) References Cited

U.S. PATENT DOCUMENTS

| 1,994,154 | A | * | 3/1935 | Tousley ........................... 36/4 |
| 2,002,527 | A | * | 5/1935 | Istvan et al. ..................... 36/4 |
| 2,121,907 | A | * | 6/1938 | Easton ............................. 36/4 |
| 2,292,455 | A | * | 8/1942 | L'Hollier et al. ......... 12/142 E |
| 2,486,953 | A | * | 11/1949 | Keene ............................. 36/4 |
| 3,319,360 | A | * | 5/1967 | Nadler ............................ 36/4 |
| 3,950,864 | A | | 4/1976 | Cooper, III et al. ...... 12/146 D |
| 5,647,150 | A | | 7/1997 | Romanato et al. ......... 36/117.1 |
| 5,743,027 | A | * | 4/1998 | Barma ............................ 36/4 |
| 5,926,976 | A | | 7/1999 | Cretinon et al. ............... 36/45 |
| 6,170,175 | B1 | | 1/2001 | Funk ............................. 36/89 |
| 2001/0015023 | A1 | | 8/2001 | Funk | |

FOREIGN PATENT DOCUMENTS

| DE | 2259449 | 6/1974 |
| EP | 0697957 | 2/1996 |
| EP | 0970629 | 1/2000 |
| FR | 1134599 | 4/1957 |
| FR | 2694167 | 2/1994 |
| FR | 2749739 | 12/1997 |
| FR | 2831068 | 4/2003 |
| GB | 2352995 | 2/2001 |

OTHER PUBLICATIONS

French Patent Application No. 01.13928 (Salmon S.A.), not yet published.

* cited by examiner

Primary Examiner—Ted Kavanaugh
(74) Attorney, Agent, or Firm—Greenblum & Bernstein, P.L.C.

(57) ABSTRACT

Reinforcement element made of a composite material constituted of a layer of inextensible textile material and a layer of polymeric material assembled to the layer of textile material during a molding or vulcanizing step. The textile material is a woven or mesh material, and the textile material is a polyester, polyamide, polypropylene or glass fiber based material. The polymeric material can be a thermosetting material, such as rubber or silicone, or an injected thermoplastic, such as polyurethane, polyvinyl chloride, or polypropylene. Advantageously, the polymeric material is at least partially transparent. The composite material can be incorporated in a boot or a binding using tightening straps. The invention also relates to a method of manufacturing such reinforcement element.

27 Claims, 3 Drawing Sheets

COMPOSITE REINFORCEMENT ELEMENT, A BOOT AND A BINDING INCORPORATING SUCH ELEMENT, AND A METHOD OF MANUFACTURING SAME

CROSS-REFERENCE TO RELATED APPLICATION

This application is based upon French Patent Application No. 01.15209, filed Nov. 21, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a reinforcement element made of a composite material particularly adapted to an application to a boot or binding using tightening straps. In addition, the invention relates to a method of manufacturing such reinforcement element.

2. Description of Background and Relevant Information

Currently, reinforcements used in boots, for example, in the area of the heel or as a tightening flap, are manufactured by injection molding a polymeric material, such as polyurethane (PU), polyether amide or a thermoplastic polyester (for example, a material commercially known as HYTREL).

Such reinforcements have the drawback of being very expensive to make, particularly due to the investment needed for injection molds.

It is also known in the field of walking/hiking boots to have outer tightening flaps made of synthetic material. Such tightening flaps are disclosed, for example, in French Patent Publication Nos. 2 694 167 and 2 749 739.

These tightening flaps are fixed, at a lower end, either on the upper or between the upper and the outer sole, as a lasting allowance, and have, at their upper end, keepers or the like that are capable of cooperating with tightening means of the lace type. These tightening flaps fulfill both functions of tightening and protecting the foot.

In the example of FR 2 694 167, the tightening flap is arranged asymmetrically and is made of polyurethane. However, due to the elasticity of this material, the tightening effect obtained was too substantial, as the PU flap stretched during tightening and then retracted, thus causing a tightening tension that was too substantial.

In the example described in FR 2 749 739, two-thirds of the height of the tightening flap are fixed to a thin plate of the same material, and its elastic length is therefore greatly reduced.

Such tightening flaps could also be made of polyether amide (such as the material commercially known as PEBAX) which are less elastic, but very expensive materials.

Therefore, polyurethane is generally the preferred material because of its mechanical properties and resistance to wear. Nevertheless, it is still expensive to implement since it requires injection molds.

In addition, its relative elasticity requires making reinforcements having a substantial thickness or complicated shapes if one wishes to have a sufficient resistance to traction.

It is also known from various patent documents, particularly European Patent Publication No. 697 957, to make boots by injecting polyurethane on a sock-shaped inside of a mold. Such three-dimensional injection methods require very complicated and expensive molds. Additionally, the sock on which the polyurethane material is injected is necessarily made of an extensible material, particularly to allow demolding the boot and the flexion thereof in certain zones.

As for the tightening straps for bindings, particularly those for snowboard bindings, they must meet very contradictory requirements. Indeed, they must first of all ensure a hold in traction of the boot on the sporting article and must therefore be inextensible. Furthermore, they must ensure anchoring of the linking/tightening members, such as binding screws, a ratchet tightening system, etc, to the sport article without material creeping. They must distribute the tightening pressure over the foot so as not to create a painful pressure spot. They must be supple in torsion and in flexion, having no hard spots, particularly in the area of the zone for fastening the linking/tightening members. These different requirements are generally met by a stacking of different layers, each one of which ensures one of the desired functions.

Thus, the strap generally has:

a foam, normally lined, for comfort and for avoiding pressures that are too localized;

inserts arranged in the area of the zones for anchoring the linking/tightening members of the strap;

an inextensible reinforcement arranged either on the inside of the strap between two foam layers or on the outside.

Such a construction is very expensive due to the stacking of layers and the number of connections by stitching that are necessary between these different layers.

Furthermore, it does not allow much flexibility as to the shape of the reinforcement. Commonly owned with the present application is French Patent Patent No. 2 831 068, which proposes improving the insert by adding to it at least one transverse tongue so as to confer to it a rigidity gradient in a direction transverse with respect to the strap, i.e., in a longitudinal direction of the boot.

Such a construction therefore makes it possible to limit the "string" effect, i.e., the overpressure effect produced by a tightening element that is more or less wire-shaped by distributing the tightening forces through the transverse tongues.

Such an insert shape allows undeniable improvements with respect to the existing tightening straps; however, the insert shapes are limited given the requirements of assembly by stitching to the other layers of the strap.

SUMMARY OF THE INVENTION

The present invention overcomes the aforementioned drawbacks and provides a new composite reinforcement element, and a method of manufacturing same, the element having the same properties of mechanical strength as known reinforcements while being inexpensive to implement.

The present invention also provides a reinforcement element that can be used to transmit traction forces, for example, for tightening a boot on the user's foot, whether the boot be a flexible or a rigid boot, or in a device for binding a boot to a sports apparatus, or an accessory, such as a gaiter, to a boot.

More specifically, the invention includes a reinforcement element made of a layer of inextensible textile material and of a layer of polymeric material assembled to the layer of textile material during a molding or vulcanizing step.

The inextensible textile material is preferably a woven material of polyester, polypropylene, glass fiber, or polyamide-based threads, so as to withstand the molding/injection and/or vulcanizing temperatures.

BRIEF DESCRIPTION OF DRAWINGS

The invention will be better understood and other features thereof will become apparent from the description that follows, with reference to the attached schematic drawings, showing several embodiments by way of non-limiting examples, and in which.

DETAILED DESCRIPTION OF THE INVENTION

Figure 1:
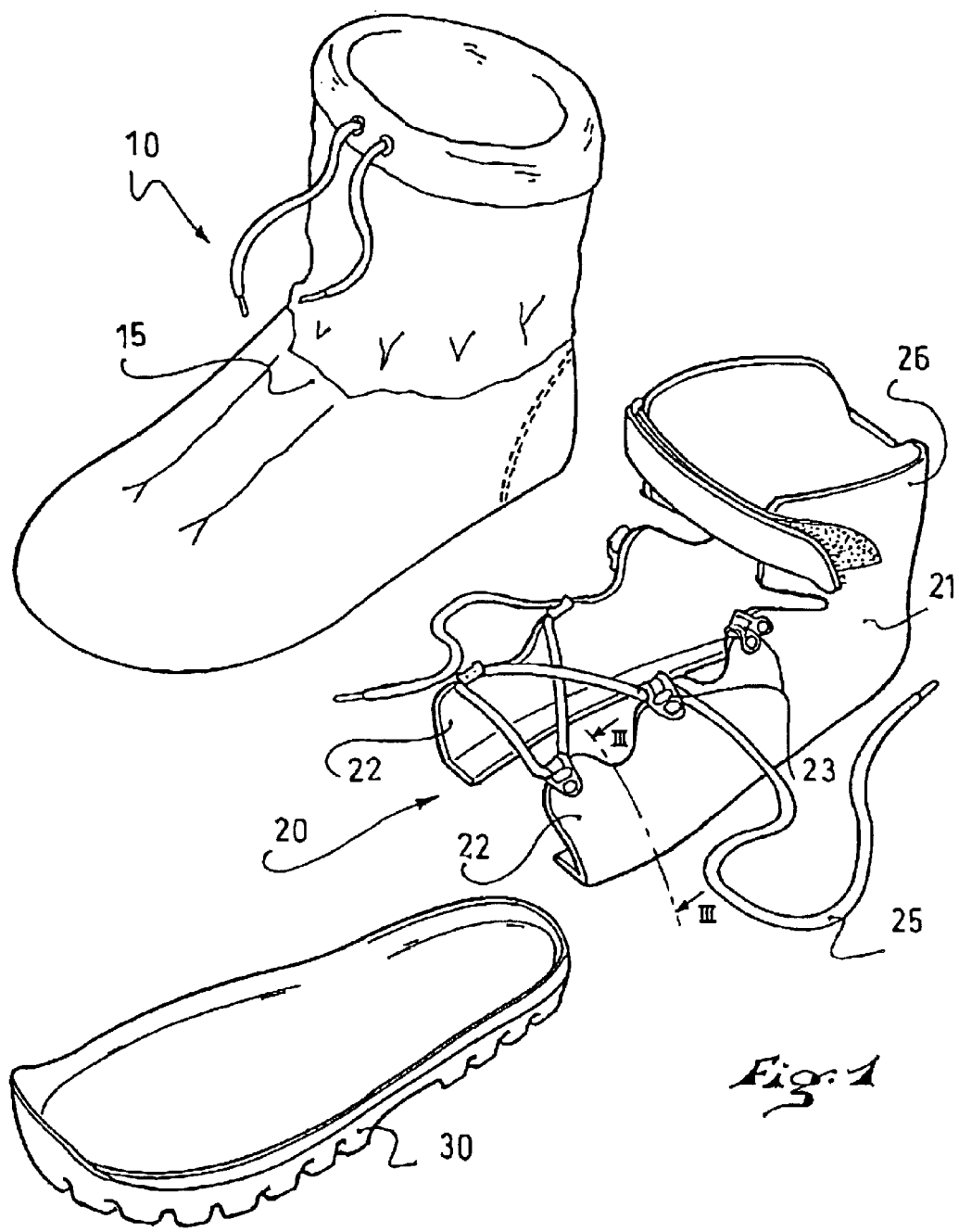
FIG. 1 is an exploded perspective view of a reinforcement according to a first embodiment applied to a boot.

FIG. 1 shows an example of a composite reinforcement 20 according to the invention and its application to a boot having a high upper 10 and an outer sole 30. In this case, the composite reinforcement 20 is in the form of a stirrup surrounding the boot heel by a heel reinforcement 21 and extending upwardly by a collar 26 to surround the lower leg. In addition, the reinforcement 20 has two lateral flaps 22 connected to the rear stiffener 21 and covering the upper 10 from the outer sole 30 up to the level of the instep 15 of the upper.

Each lateral flap 22 has, at its upper end, keepers 23 adapted to receive a lace 25 or the like for tightening the outer upper 10 of the boot in the instep zone.

Figure 2:
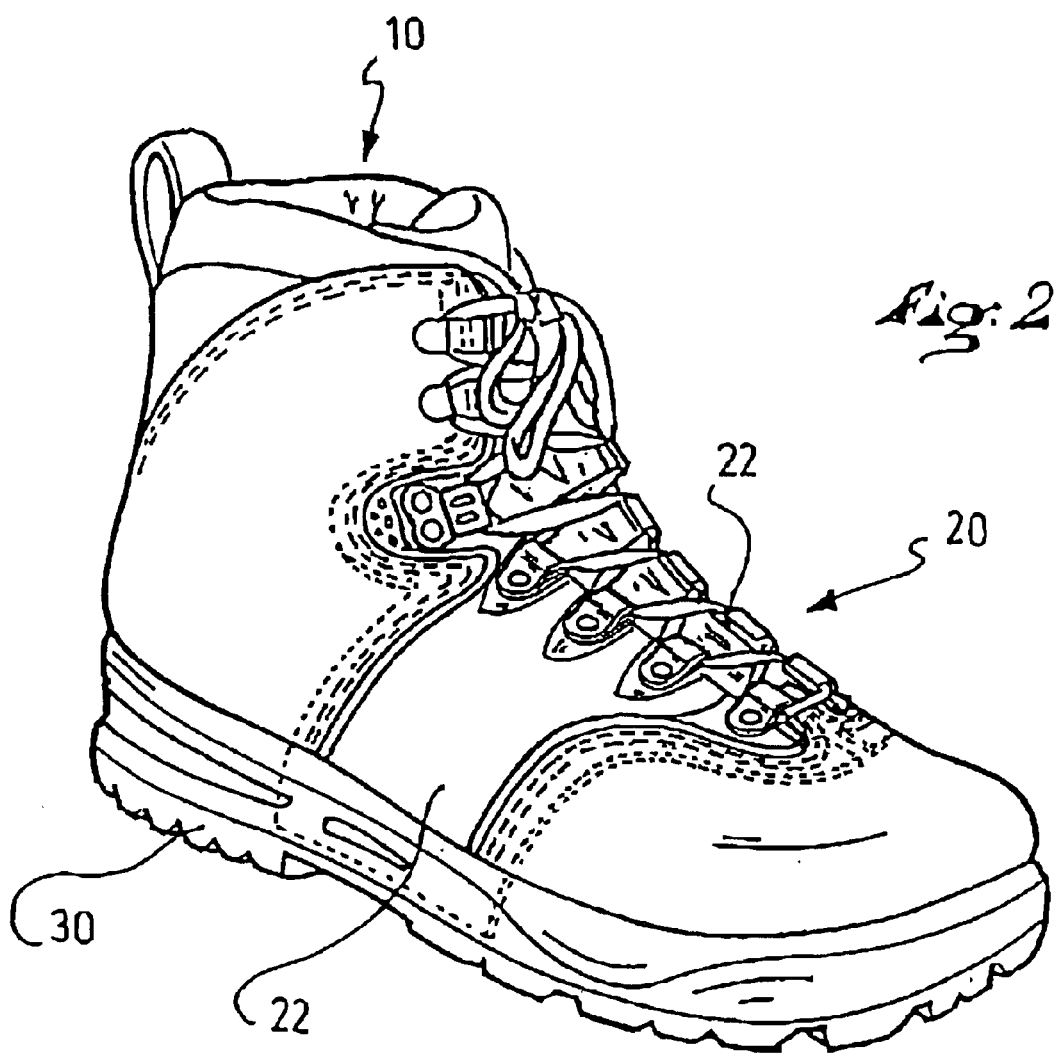
FIG. 2 is a perspective view of a boot provided with a reinforcement according to a second embodiment.

FIG. 2 shows another embodiment in which the similar or identical elements are designated by the same reference numerals.

In this case, the composite reinforcement 20 is in the form of two lateral flaps 22, laterally fixed at their lower ends to the upper 10 of the boot or between the upper 10 and the sole 30 in the lasting allowance zone, and provided at their upper ends with keepers adapted to cooperate with a lace for tightening the boot on the user's foot.

Figure 3:
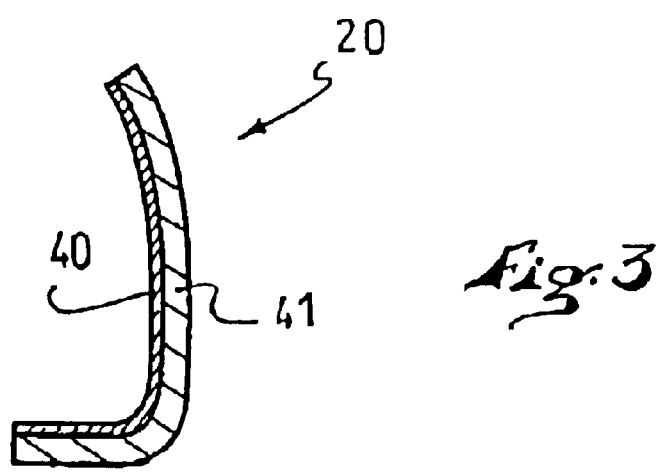
FIG. 3 is a cross-sectional view along the line III—III of FIG. 1.

In both cases, as shown in FIG. 3, the composite reinforcement 20 is constituted of a layer of inextensible textile material 40 and of a layer of polymeric material 41. The polymeric material can be a thermosetting material, such as rubber or silicone.

In the case of rubber, the manufacturing method includes placing in a mold the following:
- a precut rubber preform;
- a layer of inextensible material;
- and heating the assembly at a temperature of approximately 150° C. for approximately 7–10 minutes.

One thus obtains a complete linking of the textile material to the rubber during the vulcanizing step.

The polymeric material can also be an injected thermoplastic material, such as polyurethane, polyvinyl chloride, polypropylene, etc.

In this case, the manufacturing method includes placing the layer of inextensible material in the mold and injecting the polymeric material.

Finally, the polymeric material can be a cast polyurethane, i.e., a polyurethane whose molding occurs through mere gravity.

In all cases, the textile material is a woven or mesh type material, i.e., a material that is inextensible along its two main weaving directions and, preferably, depending on the method of manufacturing used, a material that withstands temperatures on the order of 150° C. (for association with a rubber) and/or 200–240° C. (for association with a thermoplastic polymeric material); this could be a polyester or polyamide material, for example.

In all of the cases, one obtains a complete linking of the layer of polymeric material with the layer of inextensible fabric following the molding/injection process.

In addition, the textile material compensates for the elastic features of the polymer used by its inextensibility, and the composite reinforcement thus obtained can be used to exert traction and tightening forces without risking an elastic deformation and/or creeping of the material.

Since it has equivalent properties, such a composite reinforcement is furthermore much less expensive than a normal polymeric reinforcement, since the textile material confers to the polymer accrued properties of resistance to traction.

For example, a textile/rubber composite thus obtained is cheaper and much less elastic than a conventional PU reinforcement.

Such a textile/rubber composite can support substantially stronger forces than a conventional PU reinforcement without deformation. By way of non-limiting example, the traction forces exerted locally in the area of a single keeper of such a reinforcement can be comprised between 15–20 daN without deformation, whereas with conventional PU reinforcements, 15 daN is a value that should not be exceeded as the deformations are already too substantial.

The composite reinforcement 20 can be fixed to the boot upper by stitches or by gluing, particularly with a PU-based glue.

Preferably, the composite reinforcement is flat molded, which requires molds that are simpler and therefore less expensive.

According to a preferred embodiment, the polymer used is transparent or translucent so that the layer of fabric located underneath is visible. In this case, very different and varied aesthetic effects are obtained at low cost by simply changing the color and/or the pattern of the fabric. The transparency also allows one to easily visualize the defects and therefore allows for an easier quality control.

Figure 4:
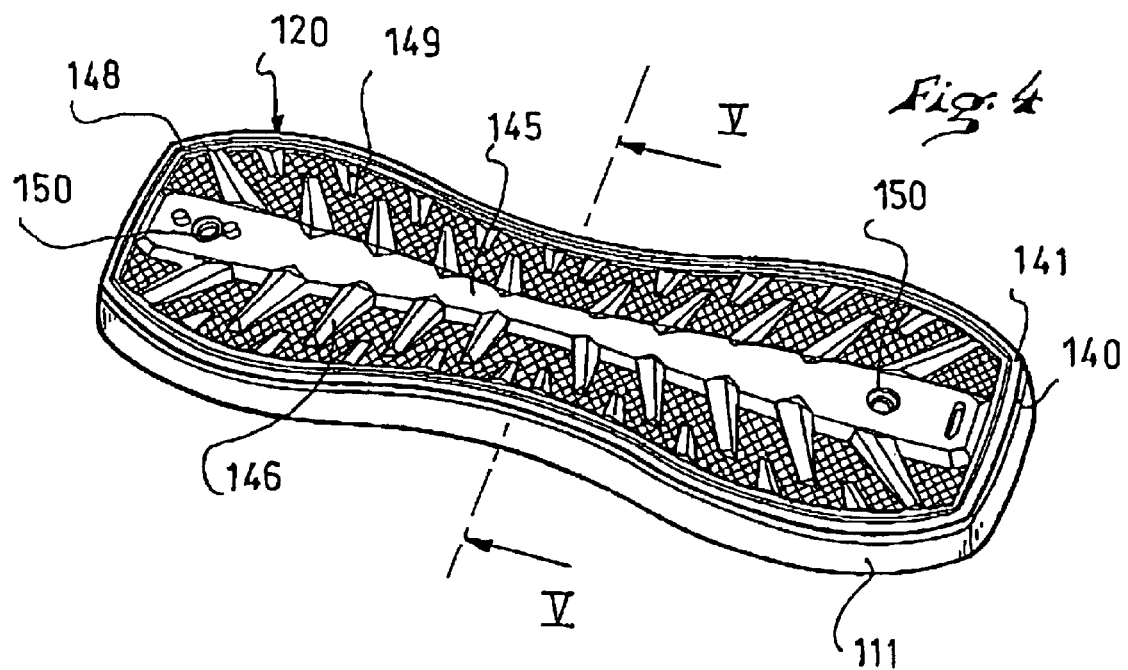
FIG. 4 is a perspective view of a tightening strap.
Figure 5:
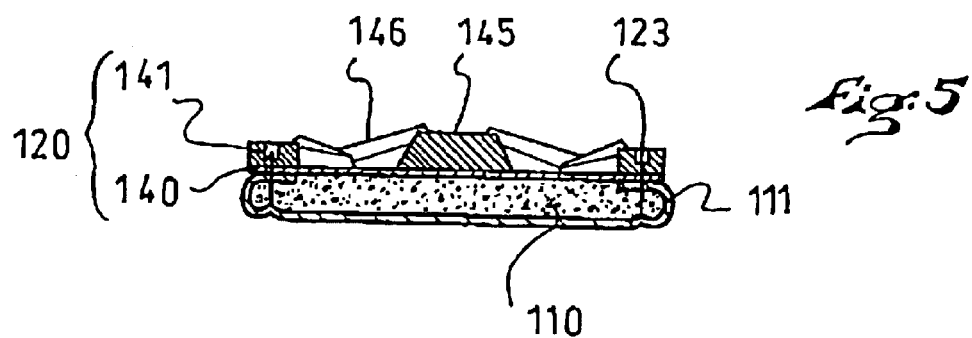
FIG. 5 is a cross-sectional view along the line V—V of FIG. 4.

FIGS. 4 and 5 show an example of application of the composite reinforcement according to the invention to a tightening strap for a snowboard binding. This strap is composed normally of a foam layer 110 surrounded by a protective fabric 111 and a reinforcement 120. In this case, the reinforcement 120 is made of a composite material constituted of a layer of inextensible textile material 140 and of a layer of polymeric material 141 assembled together throughout the molding/injection phase.

As in the previous cases, the polymeric material can be an injected thermoplastic, such as polyurethane, polyvinyl chloride, polypropylene, etc., a cast polyurethane or a thermosetting material, such as rubber or silicone. The textile material is, for example, a polyester or polyamide. The composite reinforcement 120 thus obtained is assembled to the lower foam layer by a peripheral stitching 123 made either on the periphery 148 of the polymeric material as shown, or by means of the inextensible textile of the reinforcement. In the latter case, the stitched connection can be turned under for an "invisible" assembly effect.

Other binding methods can also be provided. The layer of polymeric material 141 has a form as described in the previously cited FR 2 831 068, namely a longitudinal arm 145 provided with holes 150 for binding the tightening or anchoring members of the strap, and traverse arms 146. Such a composite reinforcement assembly 120 allows for any form of the polymeric material that constitutes it, since one is free from the obligation of sewing the tongues 146 one by one to the other layers of the strap. The composite reinforcement 120 can therefore have a layer of polymeric material 141 with a very thin and aerated form. In this case, the layer of polymeric material 141 can have, as shown in FIG. 4, a thin closed periphery 148 inside of which extends the longitudinal arm 145, and additional thin transverse tongues 149 originating from this periphery and oriented inwardly. All forms are thus allowed.

In addition, various other aesthetic effects can be obtained by changing the pattern of the textile material 140 and/or by modifying the transparency and/or the color of the polymeric material 141. Likewise, the fabric constituting the reinforcement can be placed on the outside or kept under the polymeric layer, depending on the aesthetic effect sought.

Furthermore, the strap thus obtained has, for a reduced thickness of the polymeric reinforcement, mechanical properties that are quite superior to conventional straps. As a matter of fact, tests have shown a very distinct increase in the resistance to traction, and an improvement in the elastic properties of the assembly. The strap is also much lighter since it is no longer necessary to have substantial thicknesses of the polymeric material in order to obtain the desired stiffness in a given direction. Furthermore, the strap resists creeping much better than the reinforcements normally used, particularly in the zones 150 for anchoring or binding the adjustment members that do not need to be reinforced.

By way of non-limiting example, a composite textile/PP or textile/PU strap according to the invention bears an increase of traction forces of 350N, i.e., twice as much as a conventional strap. The resistance to rupture is also multiplied by a factor of 2–4, depending on the materials used.

The present invention is not limited to the particular previously described embodiments given by way of non-limiting examples, but it encompasses all similar or equivalent embodiments.

In particular, it applies to all types of boot reinforcements, whether the boots are made of a flexible material, such as walking shoes, or of a rigid material, such as alpine ski boots. It also applies to any type of tightening strap or any element for which similar problems of resistance to traction must be resolved.

The values of the forces previously mentioned are given by way of example. These values can be modified depending on the materials, forms and thicknesses of the materials selected for a specific object sought.

What is claimed is:

1. A boot comprising:
   an outer sole;
   an upper positioned over the sole and adapted to house a foot of a wearer of the boot;
   a composite reinforcement comprising a tightening device for tightening a foot within the boot, said composite reinforcement covering at least a portion of the upper, the composite reinforcement comprising a lower end, at least the lower end of the composite reinforcement being fixed to the upper or between the upper and the sole;
   the composite reinforcement comprising a composite material, said composite material comprising a layer of inextensible textile material and a layer of polymeric material, the layer of polymeric material directly assembled to the layer of textile material by having been assembled during a molding or vulcanizing step, whereby the layer of textile material is adapted to transmit traction forces for the reinforcement element.

2. A boot according to claim 1, wherein the composite reinforcement is fixed to the upper with a PU-based glue.

3. A boot according to claim 1, wherein the textile material is a woven material or a mesh material.

4. A boot according to claim 3, wherein the polymeric material is a thermosetting material.

5. A boot according to claim 4, wherein the thermosetting material is rubber or silicone.

6. A boot according to claim 3, wherein the polymeric material is an injected thermoplastic.

7. A boot according to claim 6, wherein the injected thermoplastic is polyurethane, polyvinyl chloride, or polypropylene.

8. A boot according to claim 3, wherein the polymeric material is a cast polyurethane.

9. A boot according to claim 1, wherein the textile material is a polyester, polyamide, polypropylene, or glass fiber based material.

10. A boot according to claim 1, wherein the polymeric material is at least partially transparent.

11. A boot according to claim 1, wherein the composite reinforcement is fixed to the upper with stitches.

12. A boot according to claim 1, wherein the composite reinforcement is fixed to the upper with glue.

13. A boot according to claim 1, wherein throughout the entirety of the composite reinforcement the layer of polymeric material is molded or vulcanized directly to the layer of textile material, whereby the layer of textile material is adapted to transmit traction forces for the composite reinforcement.

14. A method for manufacturing the boot according to claim 1, comprising manufacturing the composite reinforcement, wherein the polymeric material of the composite reinforcement comprises a precut rubber preform, said method of manufacturing the composite reinforcement comprising:
   placing in a mold an assembly at least the following:
      the precut rubber preform;
      the layer of inextensible textile material;
   heating the assembly at approximately 150° C. for approximately 7–10 minutes.

15. A method for manufacturing the boot according to claim 1, comprising manufacturing the composite reinforcement, said method of manufacturing the composite reinforcement comprising:
   placing in a mold the layer of inextensible material;
   injecting the polymeric material into the mold.

16. A method for manufacturing the composite reinforcement of the boot according to claim 1, comprising manufacturing the composite reinforcement, said method of manufacturing the composite reinforcement comprising:
   placing in a mold the layer of inextensible material;
   casting the polymeric material by introducing the polymeric material into the mold by means of gravity.

17. A method according to claim 16, wherein the polymeric material comprises polyurethane.

18. A method according to claim 16, wherein the polymeric material comprises a thermosetting material.

19. A boot comprising:
   an outer sole;

an upper positioned over the sole and adapted to house a foot of a wearer of the boot;

a composite reinforcement extending over at least an instep portion of the boot, the composite reinforcement comprising a lower end, at least the lower end of the composite reinforcement being fixed to the upper or between the upper and the sole, the composite reinforcement having a front end spaced rearwardly from a front end of the upper for reinforcing the instep portion of the boot;

the composite reinforcement comprising a composite material, said composite material comprising a layer of inextensible textile material and a layer of polymeric material, the layer of polymeric material being molded or vulcanized to the layer of textile material.

20. A boot according to claim 19, wherein the layer of polymeric material is molded or vulcanized to the layer of textile material throughout the entirety of the composite reinforcement, whereby the layer of textile material is adapted to transmit traction forces for the composite material.

21. A boot according to claim 19, wherein said composite material comprises a plurality of layers, said plurality of layers consists of said layer of inextensible textile material and said layer of polymeric material.

22. A boot comprising:

an outer sole;

an upper positioned over the sole and adapted to house a foot of a wearer of the boot;

a pair of lateral flaps, each of the lateral flaps extending upwardly from a lower end to an upper end;

a tightening device cooperating with the upper ends of the lateral flaps to tightening the upper on the foot of the wearer;

each of the lateral flaps comprising a composite reinforcement for reinforcing the upper of the boot, the composite reinforcement of each of the lateral flaps comprising a composite material non-elastically extensible between the lower end to the upper end of the flaps, said composite material of each of the lateral flaps comprising:

a layer of inextensible textile material; and a layer of polymeric material;

the layer of polymeric material being molded or vulcanized to the layer of textile material.

23. A boot according to claim 22, wherein each of the lower ends of the flaps being fixed to the upper.

24. A boot according to claim 22, wherein each of the lower ends of the flaps being fixed between the upper and the sole.

25. A boot according to claim 22, wherein the tightening device comprises a lace and a plurality of keepers on the upper ends of each of the lateral flaps.

26. A boot according to claim 22, wherein both of the lateral flaps have front ends spaced rearwardly from a front end of the upper and extend upwardly in an instep area of the boot.

27. A boot according to claim 22, wherein the inextensible textile material of each of the lateral flaps comprises a woven material.

* * * * *